United States Patent
Bushell et al.

(10) Patent No.: US 6,860,688 B2
(45) Date of Patent: Mar. 1, 2005

(54) LOCKABLE NUT SYSTEM

(75) Inventors: Walter Leslie Bushell, Brisbane (AU); Peter Bruce Ariel, Brisbane (AU); Ronald Joseph Webb, Brisbane (AU)

(73) Assignee: Danley Construction Products Pty Ltd, Queensland (AU)

( * ) Notice: Subject to any disclaimer, the term of this patent is extended or adjusted under 35 U.S.C. 154(b) by 235 days.

(21) Appl. No.: 10/036,600

(22) Filed: Dec. 21, 2001

(65) Prior Publication Data

US 2002/0192048 A1 Dec. 19, 2002

(30) Foreign Application Priority Data

Jun. 15, 2001 (AU) .......................................... 51968/01

(51) Int. Cl.[7] .............................................. F16B 39/28
(52) U.S. Cl. ..................... 411/195; 411/134; 411/190; 411/191; 411/192; 411/196; 411/197; 411/204
(58) Field of Search ................................. 411/195, 190, 411/191, 192, 196, 197, 134, 204

(56) References Cited

U.S. PATENT DOCUMENTS

| | | | | |
|---|---|---|---|---|
| 101,674 A | * | 4/1870 | Southwick et al. | 411/191 |
| 289,494 A | * | 12/1883 | Bender | 411/195 |
| 334,031 A | * | 1/1886 | Morse | 411/195 |
| 343,870 A | * | 6/1886 | Unger | 411/190 |
| 533,099 A | * | 1/1895 | Swan | 411/195 |
| 597,737 A | * | 1/1898 | Parks et al. | 411/195 |
| 606,582 A | * | 6/1898 | Rohlin | 411/195 |
| 768,954 A | * | 8/1904 | Romberger | 411/193 |
| 1,021,559 A | * | 3/1912 | Steele | 411/191 |
| 1,105,095 A | * | 7/1914 | Nally | 411/195 |
| 1,122,901 A | * | 12/1914 | Gary | 411/191 |
| 1,288,599 A | * | 12/1918 | Izzo | 411/195 |
| 1,334,887 A | * | 3/1920 | Carson | 411/191 |
| 1,358,586 A | * | 11/1920 | Schwab | 411/191 |
| 1,374,015 A | * | 4/1921 | Jerruss et al. | 411/237 |
| 1,414,188 A | * | 4/1922 | Jones et al. | 411/201 |
| 2,131,812 A | * | 10/1938 | Maguire et al. | 411/191 |
| 3,221,792 A | * | 12/1965 | Poupitch | 411/134 |
| 3,275,055 A | * | 9/1966 | Gutschal | 411/134 |
| 3,670,795 A | * | 6/1972 | Kupfrian | 411/195 |
| 4,812,094 A | * | 3/1989 | Grube | 411/134 |
| 5,606,753 A | * | 3/1997 | Hashimoto | 411/7 |
| 5,674,034 A | * | 10/1997 | Bennett | 411/197 |
| 5,938,173 A | * | 8/1999 | Hayakawa | 251/214 |
| 6,010,290 A | * | 1/2000 | Slesinski et al. | 411/226 |
| 6,095,735 A | * | 8/2000 | Weinstein et al. | 411/221 |

FOREIGN PATENT DOCUMENTS

| | | |
|---|---|---|
| JP | 03268445 | 3/1993 |
| JP | 06122909 | 12/1995 |

* cited by examiner

*Primary Examiner*—John B. Walsh
*Assistant Examiner*—Carlos Lugo
(74) *Attorney, Agent, or Firm*—Buckingham, Doolittle & Burroughs, LLP; Louis F. Wagner (57) ABSTRACT

A lockable nut system for use with threaded steel bar which includes a screw threaded nut for engagement with the threaded steel bar and a locking member which is slidably engageable with the bar. The locking member is adapted to resist rotation about the bar and is also axially engageable with the nut to prevent rotation of the nut. The locking member has one or more fingers to engage the nut with an end of the finger being displaced to engage the nut as a result of deformation of a finger actuating tab or a dished body of the locking member. The locking member may engage the bar by displacement of an end of at least one tongue as a result of deformation of a tongue actuating tab during compression between the nut and a second structure.

9 Claims, 10 Drawing Sheets

LOCKABLE NUT SYSTEM

This invention is concerned with locking elements for threaded connection to threaded metal bars.

Particularly, although not exclusively, this invention is concerned with a locking system for nuts used with threaded bars.

It is common practice to provide bracing support in steel and timber framed structures and foundations to form a triangulated stiffening to resist wind loads and otherwise to restrain structural members comprising the building and/or foundation framework. Threaded steel bars are also used as "the down" bolts for cyclone rated structures.

Typically, bracing is embodied in wall frames, across rafters and other roofing structures and is connected to load bearing members in the structure. Normally a combination of tension and compression members is used to form a pin jointed framework which takes wind loads from a wall structure through the bracing framework to the foundations.

Tensionable bracing members are currently selected from:
(a) continuous threaded steel rod with a variety of attachment means;
(b) plain steel bar with welded turnbuckles;
(c) threaded steel bar with right and left hand threads on opposite ends to accommodate turnbuckles;
(d) threaded steel bar with "D" brackets.

Screw threaded bracing members have the advantage of allowing adjustable attachment of mounting members to accommodate variances in the positioning of hold down bolts or the like as well as variances in the positioning of supporting members such as columns or the like.

The use of screw threaded bracing members facilitates erection as the adjustable mounting permits an increase in length of the bracing member to assist in lifting and positioning the member between connection points on support members. Any sag in the brace member is removed by tensioning the member by adjustable mounts such as turnbuckles having left and right handed threads.

The use of adjustable bracing members thereby eliminates the necessity for drift pins and other rigging tools commonly used to accommodate small variances in fixed attachment points associated with angle bracing members.

Notwithstanding the relative advantages and disadvantages of adjustable screw threaded bracing members and non-adjustable angle bracing members angle form bracing members are widely used due to the limited tension capacity of traditional screw threaded rods which is a function of the capacity of the thread on the bar and/or the threaded mounting members.

In screw threaded bars where the thread is cut into the outer surface, this leads to a significant reduction in thread capacity.

In contrast, for threads produced by thread rolling processes, this loss of section is reduced somewhat as the thread is rolled up from a smaller diameter bar and there are few r sharp corners than in machined threads which weaken the bar by providing propagation points for stress failure.

Regardless of the means by which the thread is formed, tension capacity in the bar is limited to thread capacity. Moreover, the material strength of thread-rolled members is limited to that of a steel grade which can be thread-rolled on conventional thread-rolling equipment unless the product is later subjected to heat treatment which would then render the product uneconomical.

Thread rolled bar is finding increasing structural applications where a tensionable member is required. The relatively coarse pitch thread i, compared to a machined thread requires the use of an elongate nut to provide adequate contact area between the respective nut and bar threads.

In our copending Australian patent application 42532/00 there is described a structural bracing system employing thread rolled steel bar and tensionable end fitting for attachment of the ends of the bar to a structure and a nut locking system for use therewith. While generally satisfactory for its intended purpose, the locking system required a separate securing system to maintain engagement between a threaded nut and the nut locking member. This was inconvenient to manufacture and could not be relied upon in many applications.

One problem that arises with the use of such rods is the ability of nuts engaged with such threads to loosen when subject to vibration or other external forces. The use of a second threaded bar nut as a locknut is not considered suitable as a locking arrangement as it is not possible to obtain adequate thread compression.

Similarly, once a threaded bar is secured by a nut/locknut combination, it is not possible to loosen or tighten the bar without first undoing the locknut.

For example, threaded rods may be used in railway foundations which are subject to the regular hammering of rail vehicle passage. The repeated application of such intermittent pressure may lead to the loosening of a nut engaged with such a rod. If the nut is of particular importance to the structural integrity of, for example, a bridge, or if a significant number of bolts loosen, the potential for catastrophic failure of the system is real and possibly high. Railway engineers often take expensive precautions to avoid such a situation, usually by way of avoiding nut to rod engagement of this sort.

It would be of great benefit if a reliable system of locking a nut to a rod was provided. Further benefits would arise if to do so involved a relatively low cost-solution. Clearly, such a system would find wide applicability in areas other than the rail and building industries.

It is an aim of the present invention to overcome or alleviate at least some of the disadvantages associated with prior art locking systems for threaded couplings associated with threaded bars.

SUMMARY OF THE INVENTION

According to one aspect of the invention there is provided a lockable nut system for threaded steel bar, said lockable nut system comprising:
a screw threaded nut rotatably engageable on said threaded steel bar; and
a locking member slidably engageable on said threaded steel bar, said locking member being adapted in use to resist rotation about said bar, said nut and said locking member being axially engageable whereby in use said locking member resists rotation mat least one direction of said nut on said bar.

The locking member may be adapted to resist rotation by a screw threaded fastener extending between said locking member and a surface of said bar.

Most preferably said locking member includes inner side walls engageable with opposed side walls of said bar if required said nut and said locking member are axially engageable by one or more socket and spigot formations on respective adjacent ends of said nut and said locking member.

The lockable nut system may include deformation member for engaging the nut by deforming to engage at least one recess in the nut. The deformation member is preferably resiliently deformable. The deformation means may comprise at least one nut engaging element projecting axially from a locking member and at least one actuating element deformable from a first to a second position, thereby causing the at least one nut engaging element to engage with at least one recess or seat in the nut. Preferably, the at least one nut engaging element is a finger. Preferably, the finger has one or more ramped edges. Most preferably, the nut engaging element is urged outwards relative to a longitudinal axis of the threaded steel bar during use.

The actuating element may be one or more tabs and is preferably a pair of opposed tabs. When in a first position, the one or more tabs may be offset from a transverse plane of the locking member.

The locking means may be adapted to resist rotation around the bar by inclusion of one or more bar engaging members. The bar engaging member may be edges of an aperture of the locking member engageable with parallel sides of the threaded steel bar.

Alternatively, the bar engaging member may comprise at least one bar engaging element projecting axially from the locking member and at least one bar engaging actuating element deformable from a first position to a second position and thereby urging the bar engaging element towards the threaded steel bar. The bar engaging element may be tongue. The bar engaging actuating element may be one or more tabs. The one or more tabs may be offset from the transverse plane of the locking member when in the first position.

The nut for the lockable nut system may include an internal perimeter with a plurality of adjacent recesses for receiving the at least one nut engaging element. Alternatively or additionally, the nut may include an external perimeter with a plurality of adjacent recesses for receiving the nut engaging element.

In a further aspect, the invention resides in a locking member for a lockable nut system comprising a substantially planar body with at least one axially projecting finger and at least one finger actuating tab, wherein, in use, deformation of the at least one finger actuating tab from a first to a second position urges an end of the at least one finger in a preselected direction. The preselected direction may be outward. Preferably, the locking member further comprises at least one bar engaging tongue and at least one tongue actuating tab, wherein, in use, deformation of the at least one tongue activating tab from a first position offset from a transverse plane of the body to a second position substantially co-planar with the transverse plane of the body urges an end of the bar engaging tongue inwardly.

In yet a further aspect, the invention may reside in a nut for a lockable nut system, said nut including a plurality of recesses for receiving a portion of a locking nut. Preferably, the recesses are distributed around an internal perimeter of a bore of the nut. Alternatively, the plurality of recesses may be distributed around an outer perimeter of the nut.

In order that the invention may be more fully understood and put into practical effect, reference will now be made to preferred embodiments of the invention illustrated in the accompanying drawings in which.

While standard threaded bar may be employed with the invention, the rounded cross-sectional profile of the threads does not provide optimum tension capacity.

For this reason, it is preferred to utilise with the invention a more substantially profiled thread similar to an "Acme" style thread.

Figure 1:
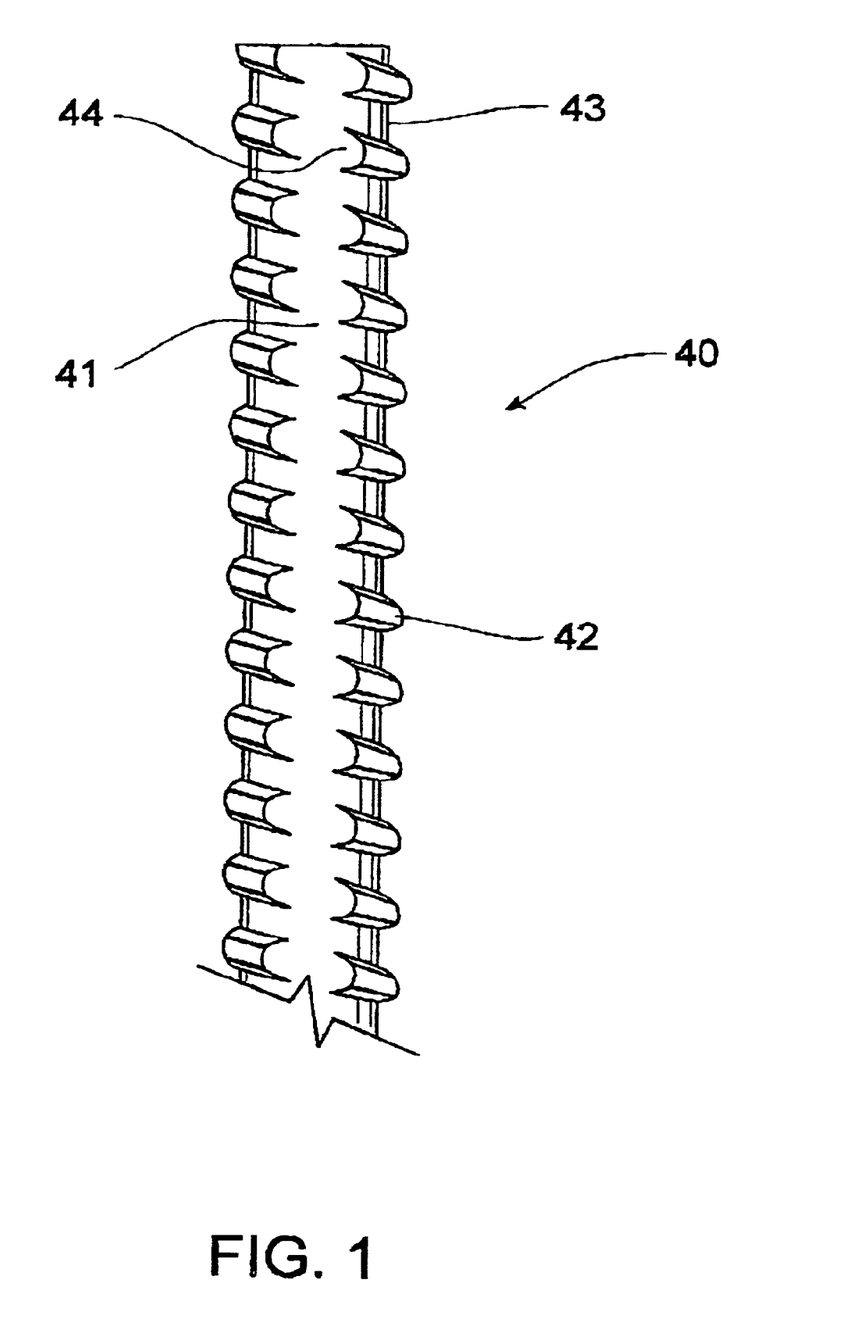
FIG. 1 shows a preferred farm of threaded steel bar for use with the invention.

FIG. 1 illustrates portion of a threaded bar 40 having a planar face 41 extending longitudinally of the bar on diametrically opposed sides thereof.

The thread comprises part helical ribs 42 extending over the diametrically opposed part circular portions 43 of bar 40, the ribs having a generally trapezoidal cross section as illustrated at the end 44 of each part helical rib 42.

Threaded bar of the type illustrated in FIG. 1 is employed widely in the mining industry for chemically anchored rock bolts and, as shown, comprises a single start thread.

Figures 2, 3, 4:
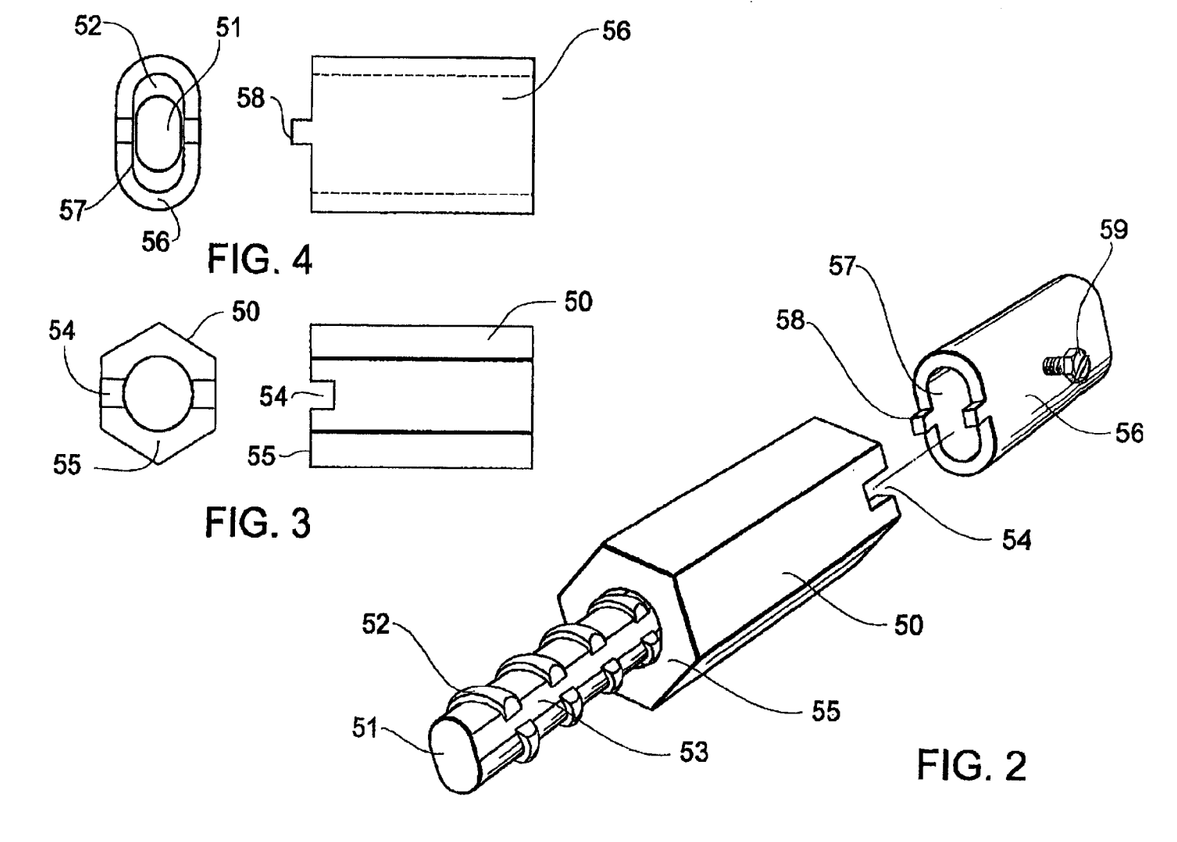
FIG. 2 shows a lockable nut system according to the invention.
FIG. 3 shows side and end views of the nut of FIG. 2.
FIG. 4 shows side and end views of the sleeve of FIG. 2.

FIGS. 2–4 show one embodiment of a nut locking system which may be employed with the invention.

In the drawings nut 50 is a conventional long bodied nut utilised with bar 51 having a thread 52 extending generally in axially opposite directions and a pair of generally planar side walls 53 therebetween. A pair of slots 54 is formed in, one or both end walls 55 of nut 50.

A locking member 56 has a cross sectional aperture with a shape complementary to the cross sectional shape of bar 51 such that the locking member is slidable therealong but is prevented from rotation by engagement of planar side walls 57 of the sleeve with the side walls 53 of the bar. The locking member 56 includes a pair of spigot like projections 58 axially engageable with slots 54 thereby effectively locking nut 50 against rotation on the bar 51.

In many applications such as diagonal or upright bracing, earth anchors or the like, the locking member 56 may be maintained in engagement with nut 50 under the influence of gravity. Where it is not possible to rely on gravitational forces to maintain engagement, a screw threaded fastener 59 or the like may be utilised to prevent disengagement between the nut 50 and locking member 56.

Figure 5:
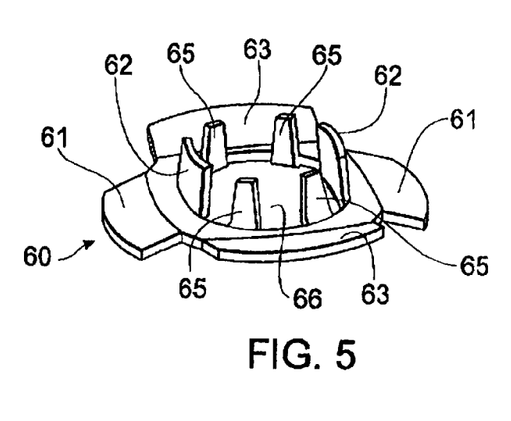
FIG. 5 is a perspective view of a locking washer for use with a lockable nut system.

FIG. 5 shows a locking member in the form of locking washer 60 which includes tongue actuating tabs 61 which are shown here in a first position which is offset from a transverse plane of the locking washer 60. Movement of the tongue actuating tab 61 to a second position which is substantially co-planar with the transverse plane of the locking washer 60 causes tongues 62 to be displaced radially inwards.

The locking washer 60 also comprises finger actuating tabs 63 which are also shown in a first position offset from the transverse plane of the locking washer 60 but, in this case, offset in a direction opposite to that of the tongue actuating tabs 61. The finger actuating tabs 63 may be moved to a second position which is substantially co-planar with the transverse plane of the locking washer 60 which results in a distal end of the fingers 65 being displaced radially outwards. The fingers are an example of nut engaging elements. The finger actuating tabs are an example of actuating elements. The locking washer 60 also includes a central aperture 66 for receiving a threaded steel bar.

Figures 6, 7:
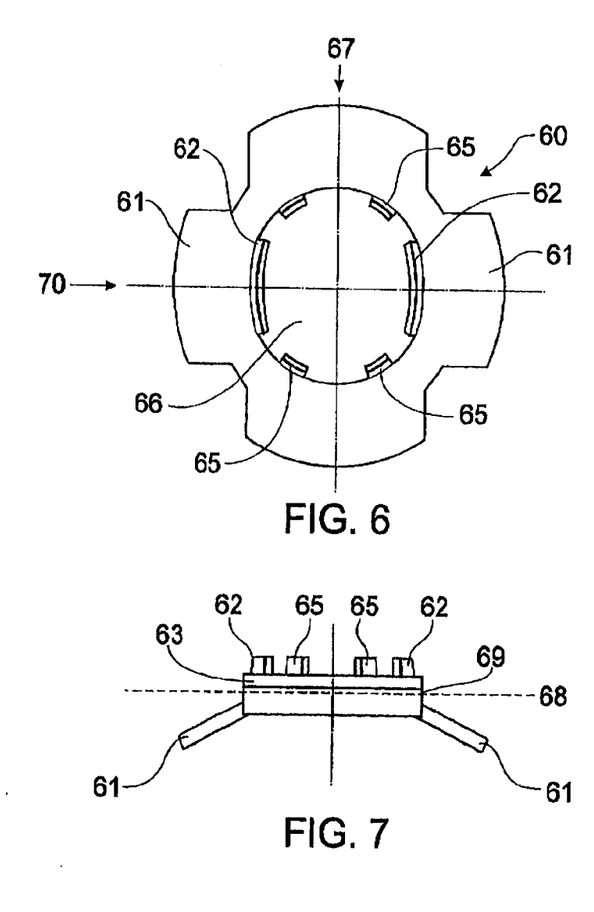
FIG. 6 is a top view of the washer of FIG. 5.
FIG. 7 is a side view of the washer of FIG. 5.

FIG. 6 shows a top view of the locking washer 60 of FIG. 5 which highlights the aperture 66 with tongue 62 and fingers 65 disposed around its periphery.

FIG. 7 is a side view of the locking washer of FIG. 6 taken in the direction of arrow 67 and showing tongue actuating tab 61 offset from the transverse plane 68. Tongues 62 project and are apparent above the body 69 of the locking washer 60. Likewise, fingers 65 are also readily apparent.

Figure 8:
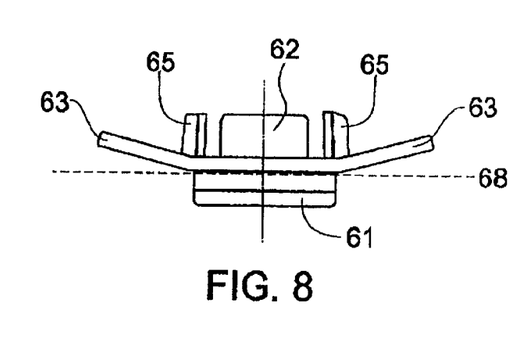
FIG. 8 is a side view of the washer of FIG. 5 orthogonal to the view of FIG. 7.

FIG. 8 is a side view of the locking washer 60 of FIG. 6 taken in the direction of arrow 70. This view shows the finger actuating tab 63 offset from transverse plane 68 in a direction opposite to that of the tongue actuating tab 61. A single tongue actuating tab 61 and two finger actuating tabs 63 are visible as are tongue 62 and fingers 65.

Figure 9:
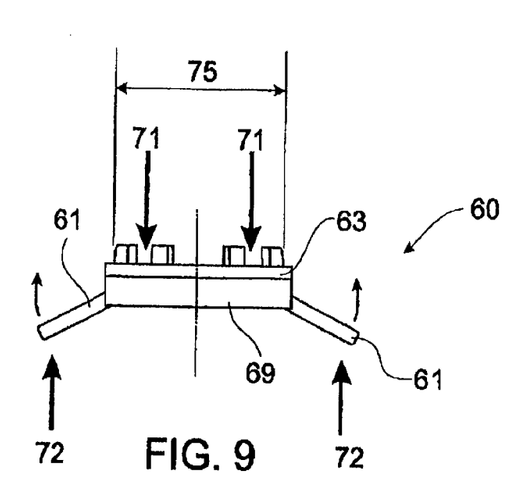
FIG. 9 is the view of FIG. 7 with indications of operative forces during use.
Figure 10:
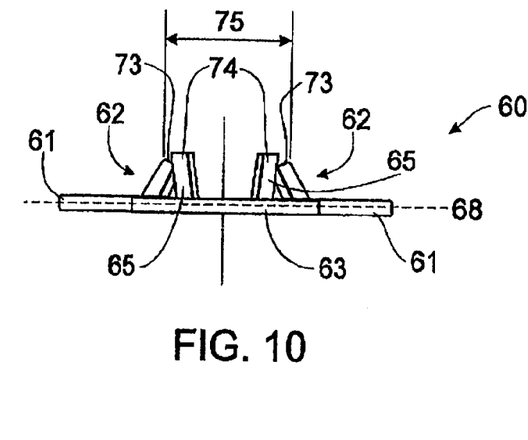
FIG. 10 is the washer of FIG. 9 when in locking position.

FIGS. 9 and 10 show the forces applied to the locking washer 60 during use and in one direction.

In use, the locking washer 60 is compressed between a first surface and a nut which threadably engages the threaded bar which is located through aperture 66. As the nut is tightened, the locking washer is compressed between two surfaces. Force is applied in the direction of arrows 71 to finger actuating tabs 63 while simultaneously an opposite force in the direction of arrow 72 is applied to tongue actuating tab 61. The locking washer is comprised of material which permits movement of the tabs 61, 63 from the first position shown to the second position shown in FIG. 10 in which all the tabs are substantially coplanar with the body 69 and transverse plane 68 of the locking washer 60.

When the tabs 61 move to the second position shown in FIG. 10, the distal ends 73 of the tongues 62 are displaced radially inwardly. At the same time as the finger activating tabs 63 are also displaced to the second position shown in FIG. 10, the distal ends 74 of the fingers 65 are displaced radially outwardly.

The degree of displacement of the distal ends 73 of the tongue 62 is seen by a comparison of the length of the dimension arrows 75 in FIGS. 9 and 10, respectively.

Figure 11:
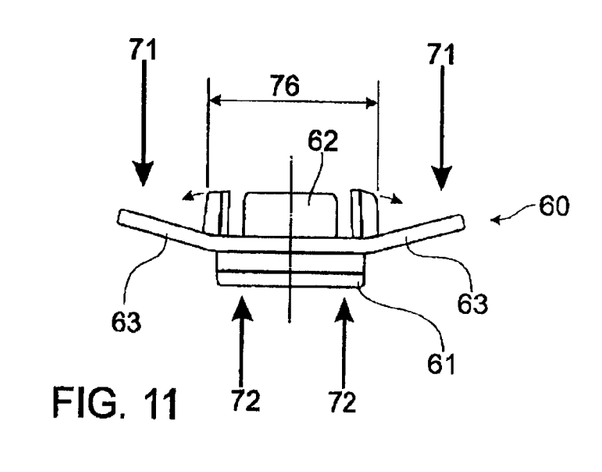
FIG. 11 is an orthogonal view of the washer of FIG. 9 with indications of operative forces during use.
Figure 12:
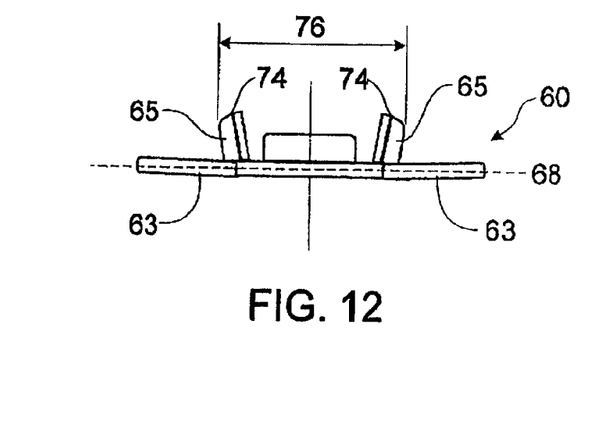
FIG. 12 is the same view as FIG. 11 when the locking washer is in locking position.

The operation of the locking washer is seen in side view at a right angle or orthogonal view to that of FIGS. 9 and 10 in FIGS. 11 and 12, respectively. As the finger actuating tabs 63 are moved from the first position seen in FIG. 11 to the second position in FIG. 12 which is substantially co-planar with the transverse plane 68 of the locking washer 60, the distal ends 74 of the fingers 65 are displaced radially outwardly. The degree of displacement is seen by comparison of the dimension arrows 76 of FIGS. 11 and 12, respectively.

Figure 13:
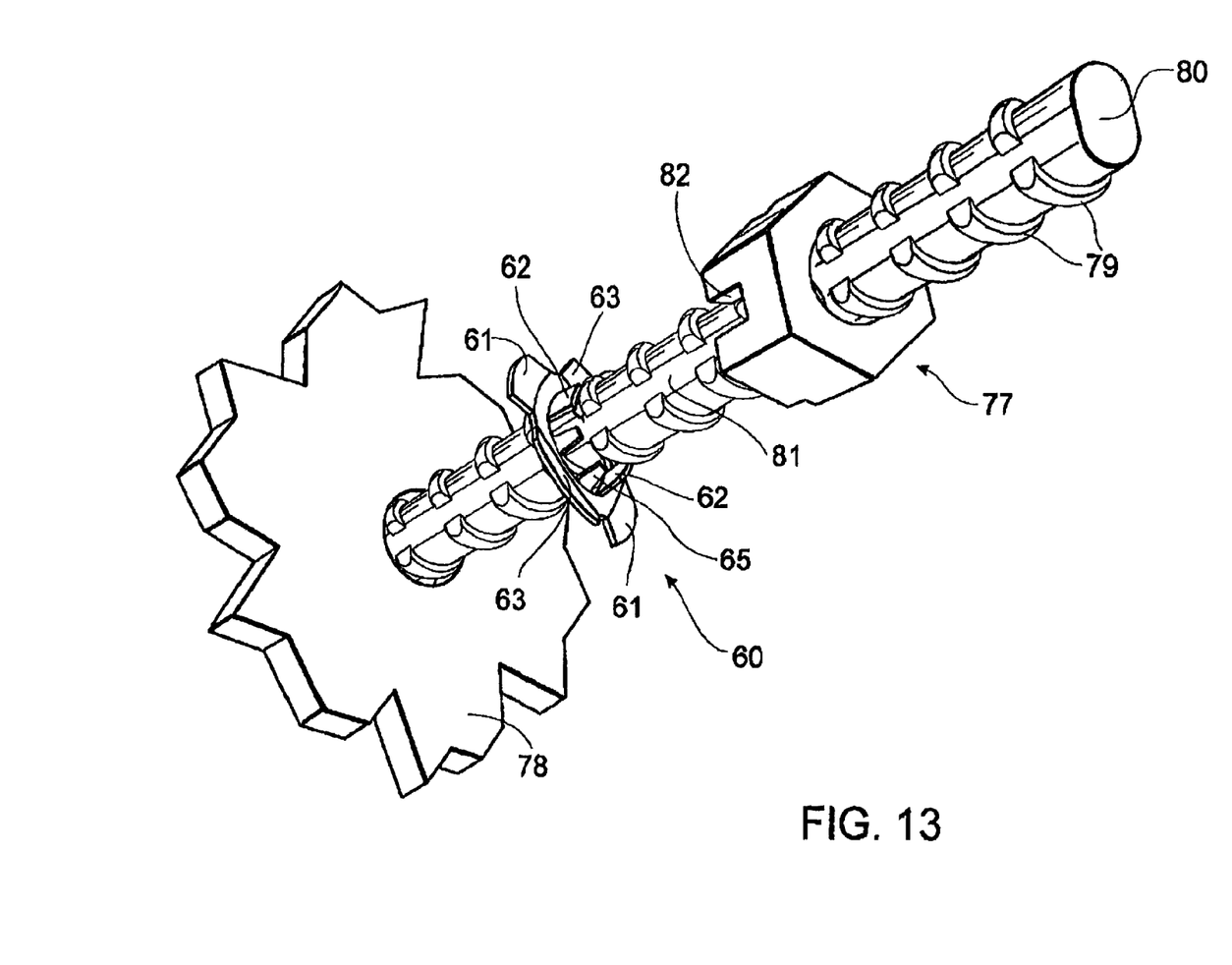
FIG. 13 is a perspective view of a lockable nut system using the washer of FIG. 5.

FIG. 13 is a perspective view of the locking washer 60 located on a threaded bar 80 and intermediate a castellated nut 77 and an immobile surface 78. The castellated nut 77 is screw threadedly engaged with a thread comprising part helical ribs 79. In use as the castellated nut 77 is advanced towards the surface 78, locking washer 60 is compressed between the nut 77 and surface 78. The locking washer is preferably sited so that one of the tongues 62 is aligned with flat 81 and the other tongue 62 is aligned with the opposed flat (not visible). In the present view, the locking washer 60 requires rotation to achieve this alignment. As the locking washer 60 is compressed tongue activating tabs 61 are flattened leading to displacement of the distal ends of the tongues 62 towards the flats 81 and subsequent contact between those structures. The engagement of the tongues 62 with the flats 81 immobilises the washer 60 relative to the rod 80.

Simultaneously with compression of the locking washer 60, the finger actuating tabs 63 are also compressed towards a transverse plane of the locking washer 60 which causes distal ends of the fingers 65 to be displaced radially outwardly. At least one of the fingers 65 will seat in one of the slots of the nut 77 as exemplified by slot 82. The presence of a finger 65 in the slot 82 will prevent rotation of the nut 77 relative to bar 80 and thereby lock the nut resisting or preventing its subsequent loosening. As used herein the references to "prevention of loosening" or the like are not intended to be construed as absolute, rather that in normal use environments, the nut locking system will prevent loosening of the nut under the influence of forces which might otherwise be expected to increase a risk of loosening of the nut in use. It readily will be apparent to a person skilled in the art that with sufficient force applied by a spanner or the like, a nut may be loosened against the locking resistance of the locking member, possibly causing damage to the components of the lockable nut system and/or the thread on the bar it is clear that if adequate rotational force is applied to the nut, the integrity of the washer may be destroyed.

Preferably, the washer is made of a material such as a spring steel with some degree of resilience which will allow the fingers to flex against an inner surface of the nut as it is tightened and subsequently spring into the slot 82. The fingers may be angled to the direction of rotation of the inner surface of the nut 77 to thereby provide a camming effect in at least one direction to allow easy tightening of the nut with a ramped radial inward displacement of the fingers. This camming or ramping effect may be in one direction alone or, preferably, may be in two directions so that the nut may be removed without damage to the locking washer allowing re-use of the locking washer.

Figure 14:
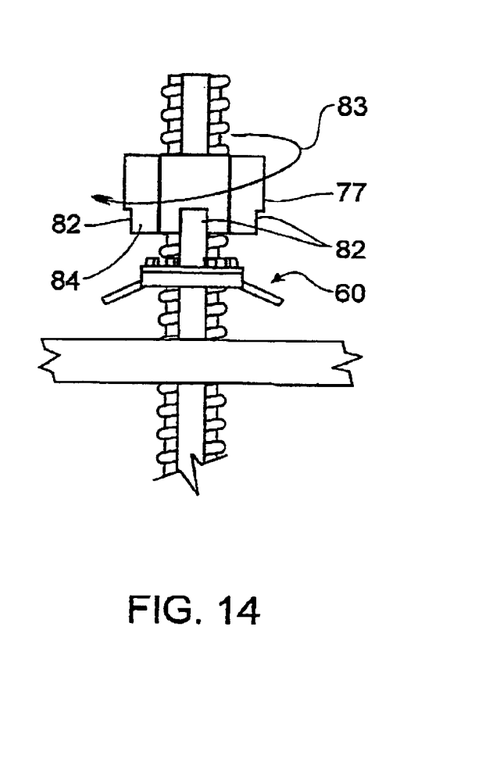
FIG. 14 is a side view of the lockable nut system of FIG. 13 aligned for application.

FIG. 14 is a side view of the arrangement of FIG. 13 in which a series of slots 82 is apparent in nut 77. The direction of rotation and tightening is shown by arrow 83 and a plan view of the components is visible in FIG. 15.

Figure 15:
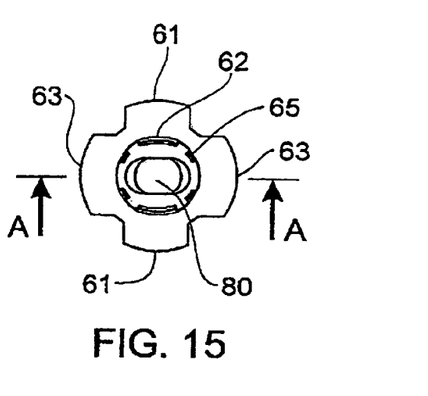
FIG. 15 is a plan view of the lockable nut system of FIG. 14.
Figure 16:
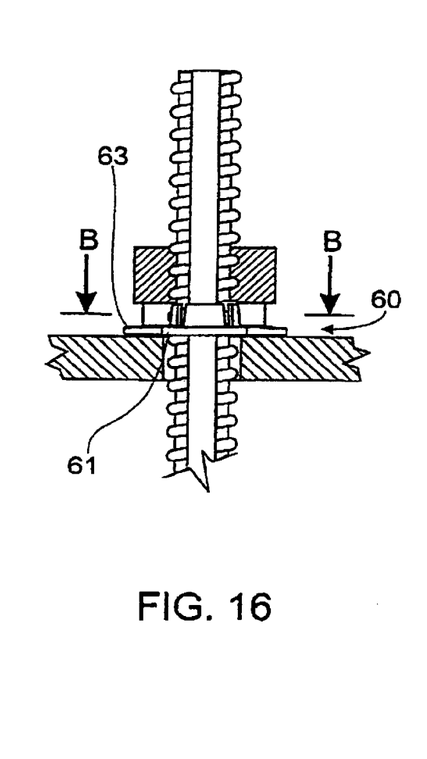
FIG. 16 is a part sectional side view of the lockable nut system of FIG. 14 when engaged taken in direction of arrows AA.

FIG. 16 shows a part sectional view of the arrangement of FIG. 15 taken along the line AA when the components of the locking system are fully engaged. The locking washer 60 is substantially flattened with the tabs 61, 63 forced into a transverse plane of the locking of the body of the washer 60.

Figure 17:
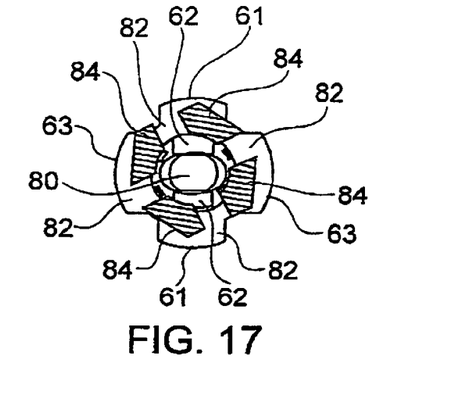
FIG. 17 is a part sectional view of the lockable nut system of FIG. 16 taken in the direction of arrows BB.

FIG. 17 is a part sectional view of the arrangement of FIG. 16 taken through the line BB showing slots 82 formed by adjacent legs 84 of the castellated nut. The tongues 62 are shown forced into engagement with bar 80. Fingers 65A, 65B are shown located in slots 82 and thereby blocking rotation of the legs 84 of the nut and therefore the nut itself.

Figure 18:
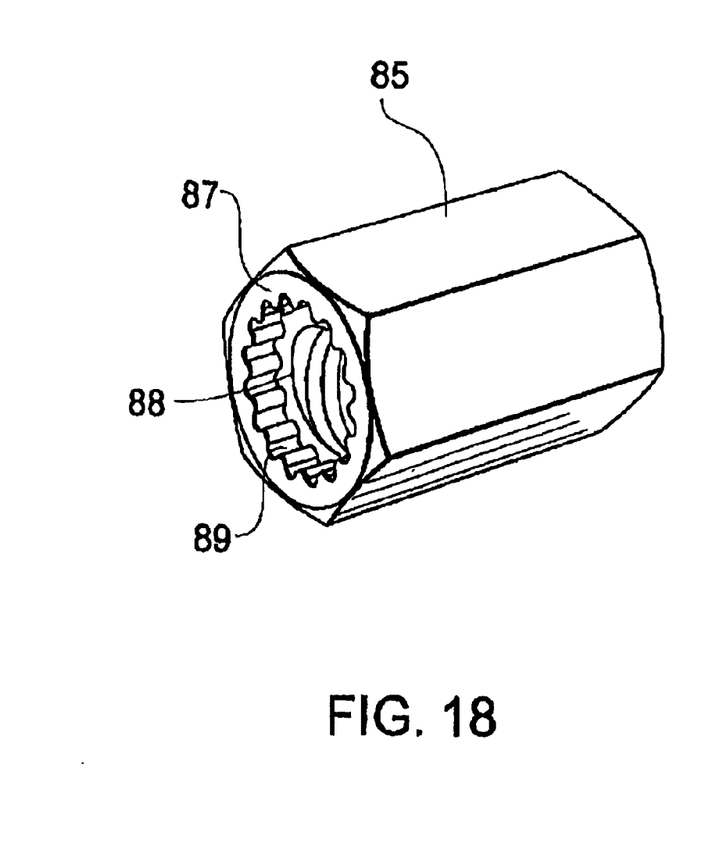
FIG. 18 is a perspective view of a nut for use in the lockable nut system according to the present invention.
Figure 19:
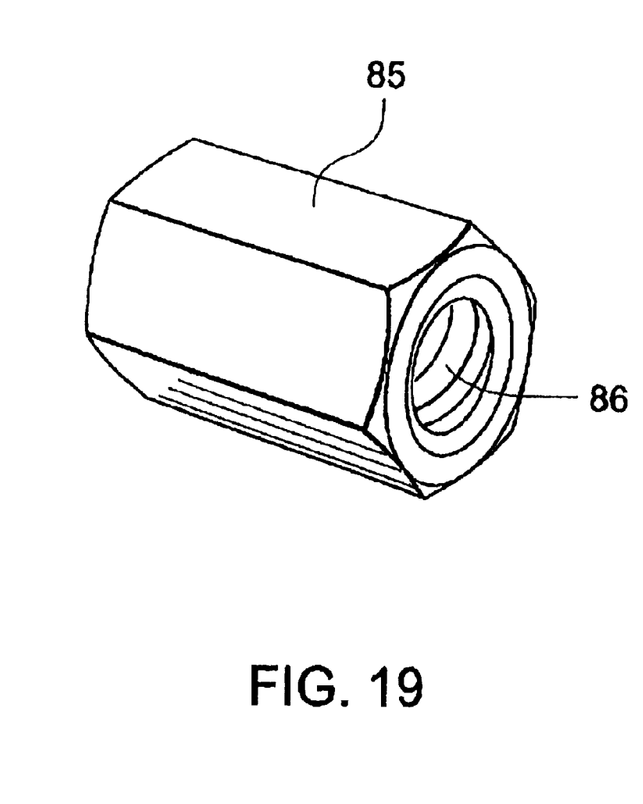
FIG. 19 is a reversed perspective view of the nut of FIG. 18.

FIGS. 18 and 19 show views of opposite ends of a preferred embodiment of a nut 85 having an internal thread 86 formed to engage the thread on a bar. A first end 87 of the nut 85 includes a recessed region 88 with a continuously toothed perimeter 89 formed internally in the nut. The recesses between adjacent teeth of the outer perimeter 89 provide seats to receive one or more locking teeth of a locking washer. In an alternative form, the toothed perimeter may be on the outside of the nut. In such a case, however, movement of the finger activating tab would need to cause ends of the fingers to be displaced radially inwards, not outwards, so that they engage the seats.

Figure 20:
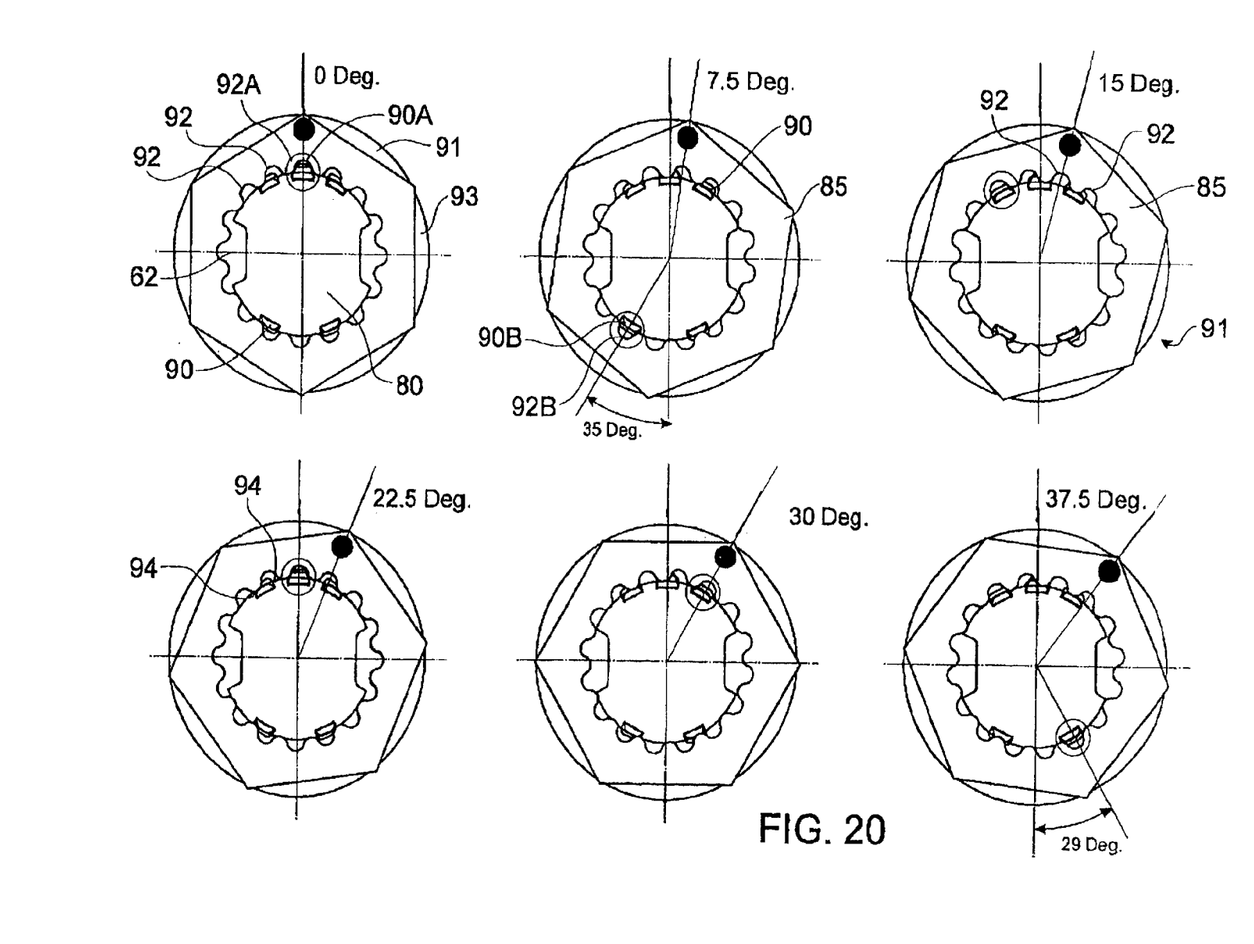
FIG. 20 is a top sectional series view of a preferred embodiment of the lockable nut system in operation.

FIG. 20 shows a series of views demonstrating the function of the nut 85 of FIG. 19 when used with five spaced teeth 90 of a locking washer 91. Adjacent recesses 92 on the nut 85 are separated by 22.5°. In the first drawing of FIG. 20, a tooth 90A is seated in a recess 92A. The second drawing of FIG. 20 shows the nut 85 rotated 7.5° with tooth 90B now located in recess 92B. The process continues throughout the rest of the figures as the nut 85 is rotated through 37.5° thereby providing each of the five teeth with a period during which they are located in a locking recess. The rod 80 is shown grasped by tongues 93. The teeth 90 are shown with ramped anterior and posterior edges 94 which allows the nut to be advanced or backed off without damaging the teeth. The teeth are displaced by a camming effect of the ramped edges so as to clear the recesses or seats. The arrangement shown provides a user with a wide variety of tightening options in use as a tooth engages a recess for every 7.5° of turn. This feature is very important to coarse pitched threads which can require a massive increase in not tightening tongue over a relatively small degree of rotation of the nut.

Figure 21:
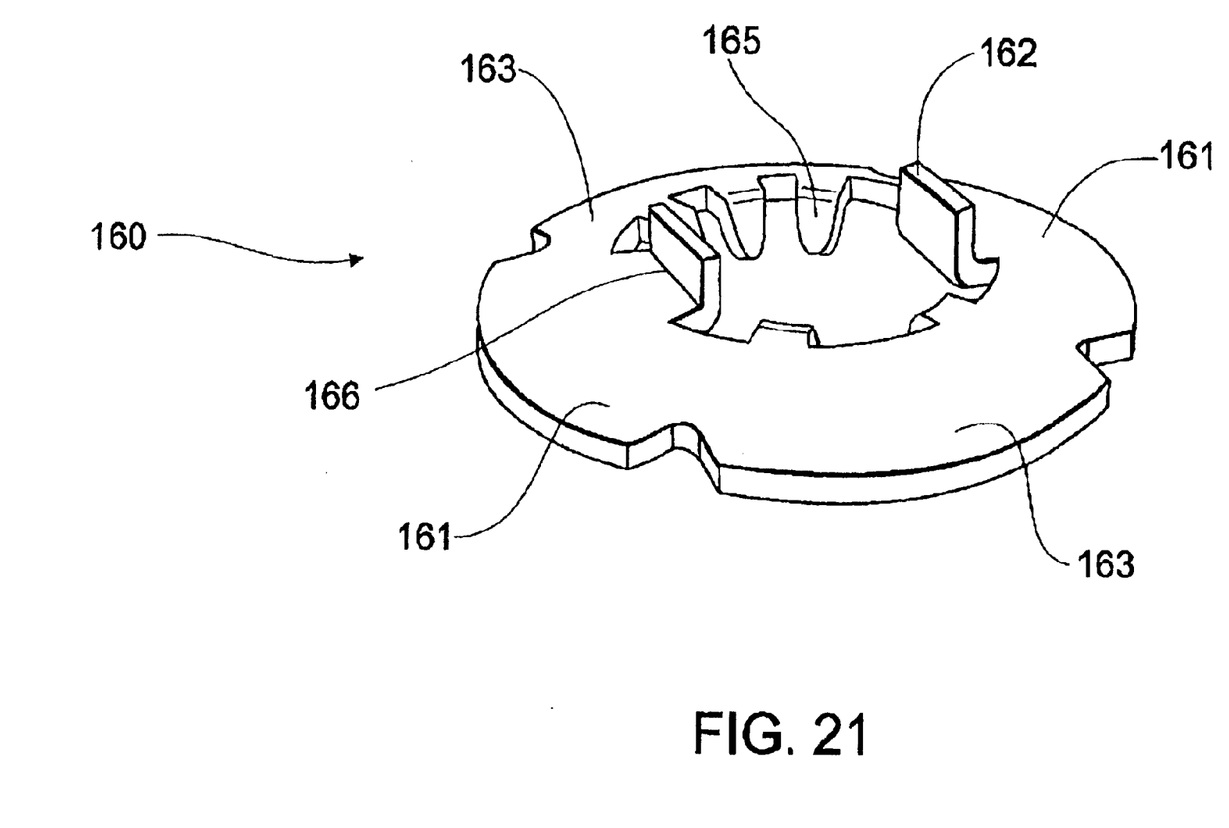
FIG. 21 is a perspective view of a further washer for use with a lockable nut system of the invention.

Referring to FIG. 21, there is shown an embodiment of a locking washer 160, wherein the tongue activating tab 161 and the finger activating tabs 163 are offset from a transverse plane of the washer 160 in the same direction. In order for the tongue 162 and fingers 165 to be displaced during use in an inward and outward direction, respectively, it is necessary that they be disposed in opposite axial directions. That is, the tongues 162 project in a first direction away from a transverse plane of the washer 160 and the fingers 165 project in the opposite direction relative to the transverse plane. In this embodiment, the tongue activating tabs 161 and finger activating tabs 163 are still shown as separate items. However, the washer may be dished or otherwise fabricated as a low truncated cone with a continuous apron forming the tabs whereby under compressing from a nut, the washer flattens to actuate both the tabs and fingers to engage the bar and nut respectively.

In a modification of the locking member of FIG. 21, the washer 160 may be dished or otherwise formed as a low frustoconical member with the convex surface extending in the same direction as teeth 165. In this embodiment tongues 162 may be dispensed with but otherwise provide shouldered abutment 166 generally coplanar with the washer in use to engage the parallel sides of the threaded bar. Tongues 162 may be formed in the same direction as fingers 165.

When this latter embodiment is compressed by a nut against an anchoring surface associated with the threaded bar coupling, the tongues 162, if present, or the shouldered abutments 166 rotate radially inwardly to engage spaced recesses formed in the outer surface of a tubular extension (not shown) formed on the end of the nut.

The embodiment shown in FIG. 21 is however, the currently most preferred locking member for a locking nut system according to the invention as it is the simplest to manufacture and by turning tongues 162 away from the nut to be locked, the depth of the finger engaging recess in the end of the nut is reduced thereby maximizing the area of engagement between the nut and bar threads.

In each of the embodiments of FIGS. 5 to 21, the ratio of the number of fingers on the locking member or washer to the number of finger engaging recesses associated with the nut is selected according to the pitch of the thread used in the nut/bar combination to accommodate large tongue variations with coarse pitched threads in particular.

In a further embodiment, the locking member for the lockable nut system may comprise a planar disc-like body having a central aperture complementary to the cross sectional shape of a bar of the type generally shown in FIG. 1 whereby relative rotation between the bar and body is prevented by engagement of the matching shapes. The disc may have one or more axially extending tabs, which can be bent down with a hammer to engage in the slots 54 of nut 50.

In a still further modification of the sleeve-like locking member 56 of FIGS. 2–4 or the disc-like body described above, they may include spigots or tabs with enlarged ends engageable in a slot or slots in a nut 50, the slot or slots having complementary shapes to the enlarged end spigots or tabs, which when urged into the slots by a hammer or the like, secure the nut and locking member against axial separation.

In its simplest form, the locking washer may comprise an oval central aperture formed to prevent or resist rotation of the washer around a bar and one or more teeth to engage locking nut. The teeth may be activated by a tab or any suitable formation such as a conically shaped body which flattens under compression and displaces the teeth radially outwardly.

FIGS. 22–26 show yet another embodiment of the invention.

Figure 22:
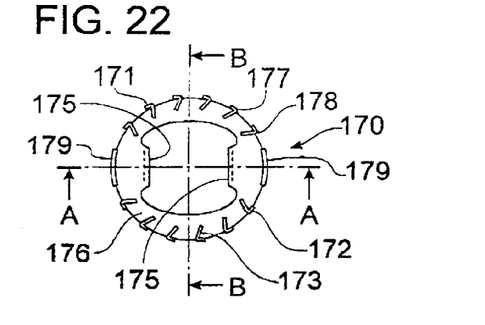
FIG. 22 is a plan view of an alternative form of locking washer.
Figure 23:
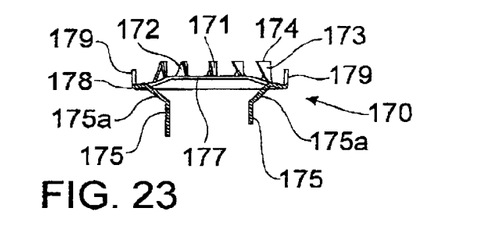
FIG. 23 is a cross sectional view along A—A in FIG. 22.

As shown in FIGS. 22 and 23, the locking washer 170 having upstanding fingers 171 located about the outer circumference of washer 170. Fingers 171 are formed with a generally tangentially directed portion 172 and a generally radially inwardly directed portion 173 which tapers divergently towards an upper end 174 thereof:

A pair of tongues 175 project inwardly and downwardly from an otherwise toroidal body 176, which as shown in FIG. 23, if formed as an upwardly dished member with an inner edge 177 lying in a plane above outer edge 178. Tongues 175 include inwardly tapered portions 175a, the purpose of which will be described later. Axially aligned with tongues 175 are upstanding alignment tabs 179, the purpose of which will be described later.

Figure 24:
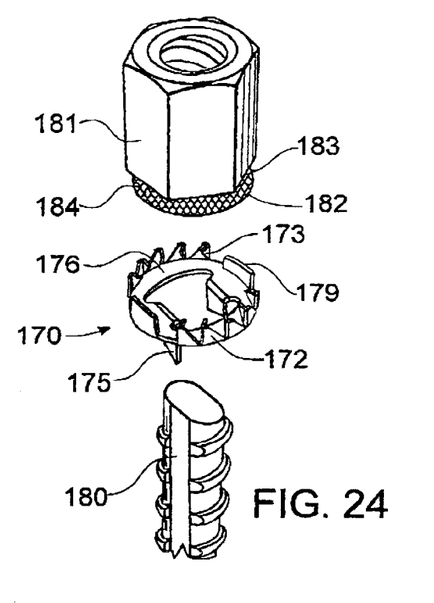
FIG. 24 is an exploded view of a lockable nut system employing the locking washer of FIGS. 22 and 23.

FIG. 24 shows an exploded view of a lockable nut assembly comprising a thread rolled bar 180, the locking washer 170 of FIGS. 22 and 23 and a lockable nut 181.

Lockable nut 181 is formed at its lower end 182 with an outwardly divergent circular land 183 having a knurled pattern 184 or similar roughened surface.

Figure 25:
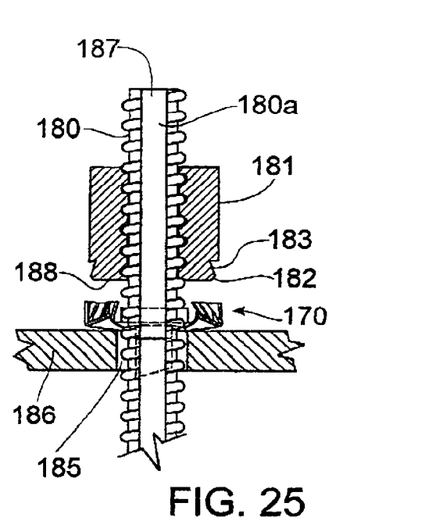
FIG. 25 is a cross sectional view of the assembly of FIG. 24 before tensioning.

As shown in FIG. 25, bar 180 may be secured in an aperture 185 in a mounting bracket 186 or the like by first sliding locking washer 170 over the free end 187 of bar 180 with tongues 175 (not shown) located adjacent opposed planar faces 180a on bar 180 and otherwise extending into aperture 185.

Figure 26:
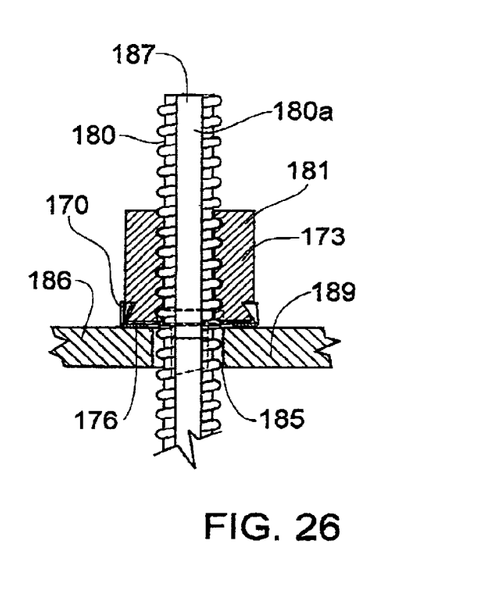
FIG. 26 is a cross sectional view of the assembly of FIG. 25 after tensioning.

FIG. 26 shows the final position of the respective components of the lockable nut assembly of FIG. 25 when nut 181 is tensioned on bar 180.

As nut 181 advances from the position shown in FIG. 25, the divergent lower end 182 of the land 183 initially engages the upper ends of tabs 179 and urges the tabs outwardly to a slight extent. This "tilting" of tabs 179 causes a limited rotation of fingers 175 in an inward direction to grip the planar sides 180a of threaded bar 180.

The lower end face 188 then engages the toroidal body 176 of lock washer 170 adjacent the inner edge 177 thereof and as the nut is tensioned it forces the upwardly dished inner region of the washer into a position generally co-planar with the upper surface 189 of bracket 186. At the same time, tapered portions 175a of tongues 175 (not shown) engage against the upper edge of aperture 185 and urge the tongues 175 into firm engagement with planar sides 180a of bar 180 to resist relative rotation therebetween. As the dished toroidal body 176 is flattened, fingers 171 rotate inwardly to engage the frusto conical end of nut 181 formed by the tapered land 183.

Nut 181 is thus secured to resist loosening under vibratory loads by the upward restoring force of dished toroidal body 176 in combination with the grip between the tapered edges of fingers 171 and the knurled surface 184 of land 183.

As an alternative to the utillsation of spring steel for washer 170, it may be made of a more malleable steel such as mild steel whereby the dished toroidal body 176 is plastically deformed under tension.

This plastic deformation causes fingers 171 to engage the frusto conical land 183 and prevent loosening of the nut by the engagement between the tapered edges of fingers 171 and knurled surface 184 as well as the restoring forces resisting bending of fingers 171 in an outward direction nut 181 tries to move axially away from washer 170.

In the embodiment shows in FIGS. 22–26, washer 170 is restrained against rotation relative to bar 180 by engagement between tongues 175 and respective planar sides 180a of bar 180.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

It will be readily apparent to a skilled addressee that many modifications and variations may be made to the invention without departing from the spirit and scope thereof;

What is claimed is:

1. A lockable nut system for threaded steel bar having a non-circular cross-sectional shape with at least one planar side wall, said lockable nut system comprising:
    a screw threaded nut rotatably engageable on said threaded steel bar; and
    a locking member comprising a generally disc-like body slidably engageable on said threaded steel bar, said locking member being adapted in use to resist rotation about said bar by engagement of at least one inner side wall of said locking member with a respective side wall of said bar, said locking system characterized in that said nut and said locking member are axially engageable by one or more spigot and socket formations on respective adjacent ends of said nut and said locking member, wherein said one or more spigot formations comprise at least one nut engaging element projecting axially from said locking member; and said one or more socket formations comprise at least one recess in said nut and, at least one actuating element on said locking member being deformable from a first to a second position, in use, urging said at least one nut engaging element into engagement with said at least one recess in the nut, said nut and said locking member being axially engageable whereby in use said locking member resists rotation in at least one direction of said nut on said bar.

2. The lockable nut system of claim 1, wherein the at least one nut engaging element comprises a finger.

3. The lockable nut system of claim 1, wherein the at least one actuating element comprises one or more tabs deformable under compression by said nut.

4. The lockable nut system of claim 1 including a bar engaging member comprising:
    at least one bar engaging element projecting axially from the locking member; and
    at least one bar engaging actuating element deformable from a first position to a second position thereby urging said bar engaging element towards the threaded steel bar.

5. A locking member for the lockable nut system of claim 1, said locking member comprising a dished, generally toroidal body, said body comprising at least one finger projecting axially from an inner edge of said body adjacent a finger actuating portion wherein in use, deformation of said at least one finger actuating portion from a first position inclined to a transverse plane of said body to a second position substantially co-planar with said transverse plane of said body urges an end of said at least one axially projecting finger outwardly to engage an adjacent inner end of a nut to resist rotation thereof.

6. A locking member for a lockable nut system of claim 5 further comprising at least one bar engaging tongue projecting axially from an inner edge of said body adjacent a tongue actuating portion wherein deformation of said at least one tongue actuating portion from a first position inclined to a transverse plane of the body to a second position substantially co-planar with the transverse plane of the body urges an end of said bar engaging tongue inwardly towards a generally planar face of said threaded steel bar.

7. The lockable nut system of claim 4 wherein said at least one nut engaging element and said at least one bar engaging element extend in the same axial direction.

8. The lockable nut system of claim 4 wherein said at least one nut engaging element and said at least one bar engaging element extend in opposed axial directions.

9. A locking member as claimed in claim 6 wherein said at least one finger and said at least one bar engaging tongue extend in opposed axial directions.

* * * * *

UNITED STATES PATENT AND TRADEMARK OFFICE
CERTIFICATE OF CORRECTION

PATENT NO. : 6,860,688 B2
DATED : November 28, 2005
INVENTOR(S) : Bushell et al.

It is certified that error appears in the above-identified patent and that said Letters Patent is hereby corrected as shown below:

Column 1,
Line 55, delete "few r" and substitute with -- fewer --.

Column 2,
Line 1, delete "i,".
Line 52, delete "mat" and substitute with -- in at --.

Column 3,
Line 59, delete "farm" and substitute with -- form --.

Column 9,
Line 23, delete "utillsation" and substitute with -- utilisation --.

Signed and Sealed this

Seventh Day of February, 2006

JON W. DUDAS
*Director of the United States Patent and Trademark Office*

UNITED STATES PATENT AND TRADEMARK OFFICE
CERTIFICATE OF CORRECTION

PATENT NO. : 6,860,688 B2  
DATED : November 28, 2005  
INVENTOR(S) : Bushell et al.

Page 1 of 1

It is certified that error appears in the above-identified patent and that said Letters Patent is hereby corrected as shown below:

Column 1,
Line 55, delete "few r" and substitute with -- fewer --.

Column 2,
Line 1, delete "i,".
Line 52, delete "mat" and substitute with -- in at --.

Column 3,
Line 59, delete "farm" and substitute with -- form --.

Column 9,
Line 23, delete "utillsation" and substitute with -- utilisation --.

This certificate supersedes Certificate of Correction issued February 7, 2006.

Signed and Sealed this

Twenty-first Day of March, 2006

JON W. DUDAS
*Director of the United States Patent and Trademark Office*

UNITED STATES PATENT AND TRADEMARK OFFICE
CERTIFICATE OF CORRECTION

PATENT NO. : 6,860,688 B2
DATED : November 28, 2005
INVENTOR(S) : Bushell et al.

It is certified that error appears in the above-identified patent and that said Letters Patent is hereby corrected as shown below:

Column 1,
Line 55, delete "few r" and substitute with -- fewer --.

Column 2,
Line 1, delete "i,".
Line 52, delete "mat" and substitute with -- in at --.

Column 3,
Line 59, delete "farm" and substitute with -- form --.

Column 9,
Line 23, delete "utillsation" and substitute with -- utilisation --.

This certificate supersedes Certificate of Correction issued February 7, 2006 and March 21, 2006.

Signed and Sealed this

Twenty-fifth Day of April, 2006

JON W. DUDAS
*Director of the United States Patent and Trademark Office*

UNITED STATES PATENT AND TRADEMARK OFFICE
CERTIFICATE OF CORRECTION

PATENT NO. : 6,860,688 B2  
DATED : March 1, 2005  
INVENTOR(S) : Bushell et al.

It is certified that error appears in the above-identified patent and that said Letters Patent is hereby corrected as shown below:

<u>Column 1,</u>
Line 55, delete "few r" and substitute with -- fewer --.

<u>Column 2,</u>
Line 1, delete "i,".
Line 52, delete "mat" and substitute with -- in at --.

<u>Column 3,</u>
Line 59, delete "farm" and substitute with -- form --.

<u>Column 9,</u>
Line 23, delete "utillsation" and substitute with -- utilisation --.

This certificate supersedes Certificate of Correction issued February 7, 2006 and March 21, 2006 and April 25, 2006.

Signed and Sealed this

Twenty-third Day of May, 2006

JON W. DUDAS  
*Director of the United States Patent and Trademark Office*